(12) United States Patent
Wang et al.

(10) Patent No.: US 8,843,422 B2
(45) Date of Patent: Sep. 23, 2014

(54) CLOUD ANOMALY DETECTION USING NORMALIZATION, BINNING AND ENTROPY DETERMINATION

(75) Inventors: Chengwei Wang, Atlanta, GA (US);
Vanish Talwar, Campbell, CA (US);
Partha Ranganathan, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 365 days.

(21) Appl. No.: 13/386,771

(22) PCT Filed: Mar. 31, 2010

(86) PCT No.: PCT/US2010/029319
§ 371 (c)(1),
(2), (4) Date: Jan. 24, 2012

(87) PCT Pub. No.: WO2011/123104
PCT Pub. Date: Oct. 6, 2011

(65) Prior Publication Data
US 2012/0136909 A1 May 31, 2012

(51) Int. Cl.
*G06F 15/18* (2006.01)
*G06F 21/55* (2013.01)

(52) U.S. Cl.
CPC ................................. *G06F 21/552* (2013.01)
USPC ........................................................ 706/12

(58) Field of Classification Search
USPC .................................................. 706/12, 45
See application file for complete search history.

(56) References Cited

U.S. PATENT DOCUMENTS

2003/0236652 A1 12/2003 Scherrer et al.
2009/0193293 A1 7/2009 Stolfo et al.

OTHER PUBLICATIONS

Chengwei Wang et al., "EbAT: An Entropy Based Online Anomaly Tester for Data Center Management," 2009 IFIP/IEEE Intl. Symposium on Integrated Network Management-Workshops, IEEE, 2009, pp. 79-80.
Chengwei Wang, "EbAT: Online Methods for Detecting Utility Cloud Anomalies," MDS '09, Nov. 30, 2009, Urbana Champaign, Illinois, USA, pp. 1-6, ACM.
Notification of Transmittal of the International Search Report and the Written Opinion of the International Searching Authority, or the Declaration, Hewlett-Packard Development Company, L.P., et al., International Application No. PCT/US2010/029319 filed Mar. 31, 2010, Date of Mailing: Dec. 22, 2010, pp. 1-10.
Paul Barham et al., "Magpie: Online Modelling and Performance-Aware Systems," Microsoft Research Ltd., Cambridge, UK, Jun. 16, 2003, pp. 1-10, Available at: <research.microsoft.com/pubs/67364/magpiehotos03.pdf>.
Vibhore Kumar et al., "A State-Space Approach to SLA Based Management," IEEE, 2008, pp. 192-199.

*Primary Examiner* — David Vincent (57) ABSTRACT

Illustrated is a system and method for anomaly detection in data centers and across utility clouds using an Entropy-based Anomaly Testing (EbAT), the system and method including normalizing sample data through transforming the sample data into a normalized value that is based, in part, on an identified average value for the sample data. Further, the system and method includes binning the normalized value through transforming the normalized value into a binned value that is based, in part, on a predefined value range for a bin such that a bin value, within the predefined value range, exists for the sample data. Additionally, the system and method includes identifying at least one vector value from the binned value. The system and method also includes generating an entropy time series through transforming the at least one vector value into an entropy value to be displayed as part of a look-back window.

15 Claims, 12 Drawing Sheets

CLOUD ANOMALY DETECTION USING NORMALIZATION, BINNING AND ENTROPY DETERMINATION

BACKGROUND

Data centers are organized horizontally in terms of components that include cores, sockets, nodes enclosures, racks, and containers. Further, each physical core may have plurality of software applications organized as a vertically in terms of software stack that includes components such as applications, Virtual Machines (VMs)/Operating Systems (OSs), and Hypervisors/Virtual Machine Monitors (VMMs). The horizontal organization is referenced herein as an H-Crossing, while the vertical organization is referenced herein as a V-Crossing.

The H-Crossing and V-Crossing components generate an enormous amount of metric data regarding their performance. For example, assuming 10 million cores are used in data center, with 10 virtual machines per node, the total amount of metrics generated by such a data center can reach $10^{18}$. These metrics may include Central Processing Unit (CPU) cycles, memory usage, bandwidth usage, and other suitable metrics.

The H-Crossing and V-Crossing components also manifest the property of dynamism such that one or more of these components can become active or inactive on an ad hoc basis based upon user needs. For example, heterogeneous applications such as map-reduce, social networking, e-commerce solutions, multitier web applications, and video stream may be executed on an ad hoc basis and have vastly different workload/request patterns. Online management of VMs and power adds to this dynamism.

Data anomalies in the H-Crossing and the V-Crossing can be addressed through the use of various thresh hold based methods. These threshold methods utilize a threshold limit that if, for example, is exceeded or met an anomaly alarm is triggered. The threshold value may be based upon a pre-defined performance knowledge of a particular component of the H-Crossing or V-Crossing, or long term historical data related to these components. These thresholds may be set for each component in the H-Crossing and the V-Crossing.

BRIEF DESCRIPTION OF THE DRAWINGS

Some embodiments of the invention are described, by way of example, with respect to the following figures.

DETAILED DESCRIPTION

Illustrated is a system and method for anomaly detection in data centers and across utility clouds using an EbAT method that analyzes metric distributions (e.g., referred to herein as "metric" and including service-level metrics, system-level metrics and platform metrics) rather than individual metric thresholds of the components of the H-Crossing and V-Crossing. As illustrated herein, entropy is used as a measurement to capture the degree of dispersal or concentration of such metric distributions. The resulting entropy distributions aggregate raw metric data across the utility cloud to form "entropy time series," and in addition, each hierarchy of the cloud (e.g., H-Crossing components such as data center, container, rack, enclosure, node, socket, core) can generate higher level from lower level entropy time series. This entropy time series may be displayed as part of a "look-back window." Tools, such as spike detecting (e.g., visually or using time series analysis), signal processing or subspace method, are used to identify anomalies in entropy time series in general and at each level of the hierarchy.

In some example embodiments, a system and method is illustrated for anomaly detection in data centers and across utility clouds using an EbAT method. Included as part of this method is metric collection operation where the various metric distributions are collected from the components of the H-Crossing and V-Crossing. A further operation is executed to generate an entropy time series. As part of the generation of this entropy time series, a preprocessing regime is implemented that preprocesses the samples of the metric distribution through a normalizing and binning these samples. After the preprocessing regime is implemented, operations are executed to generate an entropy time series through entropy calculation, m-event generation and entropy aggregation. An operation is executed to process the entropy time series, for display as part of the look-back window, using one of the above referenced tools.

Figure 1:
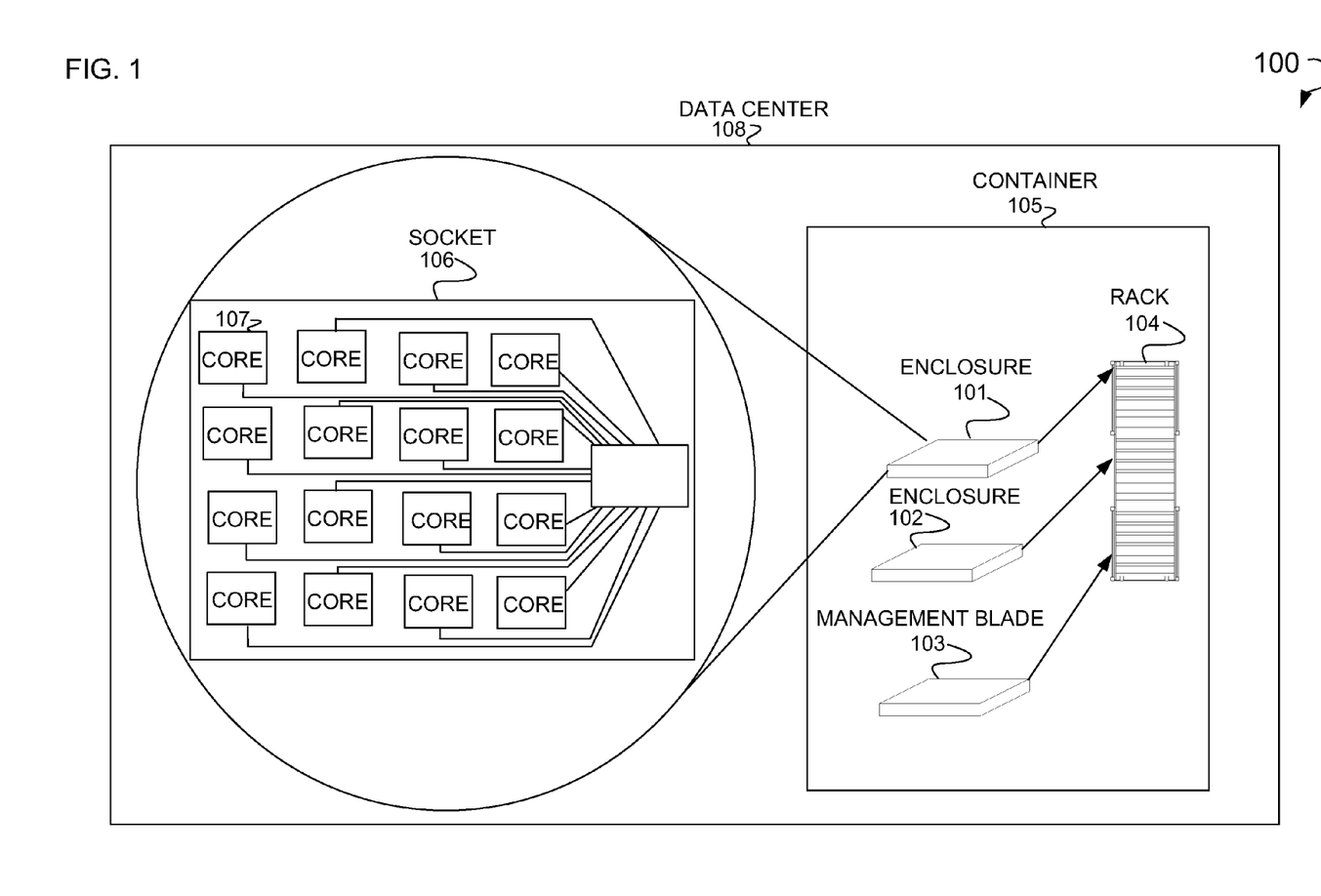
FIG. 1 is a block diagram of a cloud architecture, according to an example embodiment, illustrating the hierarchical organization of an H-Crossing and the various components that make up this H-Crossing.

FIG. 1 is a block diagram of an example cloud architecture 100 illustrating the hierarchical organization of an H-Crossing and the various components that make up this H-Crossing. Shown is a core 107 that resides, along with other cores, as part of a socket 106. This socket 106 is, in turn, part of an enclosure 101. The enclosures 101-102 and a management blade 103 are part of a rack 104. An example of an enclosure 101 or 102 is a collection of compute blades. The rack 104 is part of a container 105. The container 105 is part of a data center 108. A plurality of each of these components can be part of the cloud 100.

Figure 2:
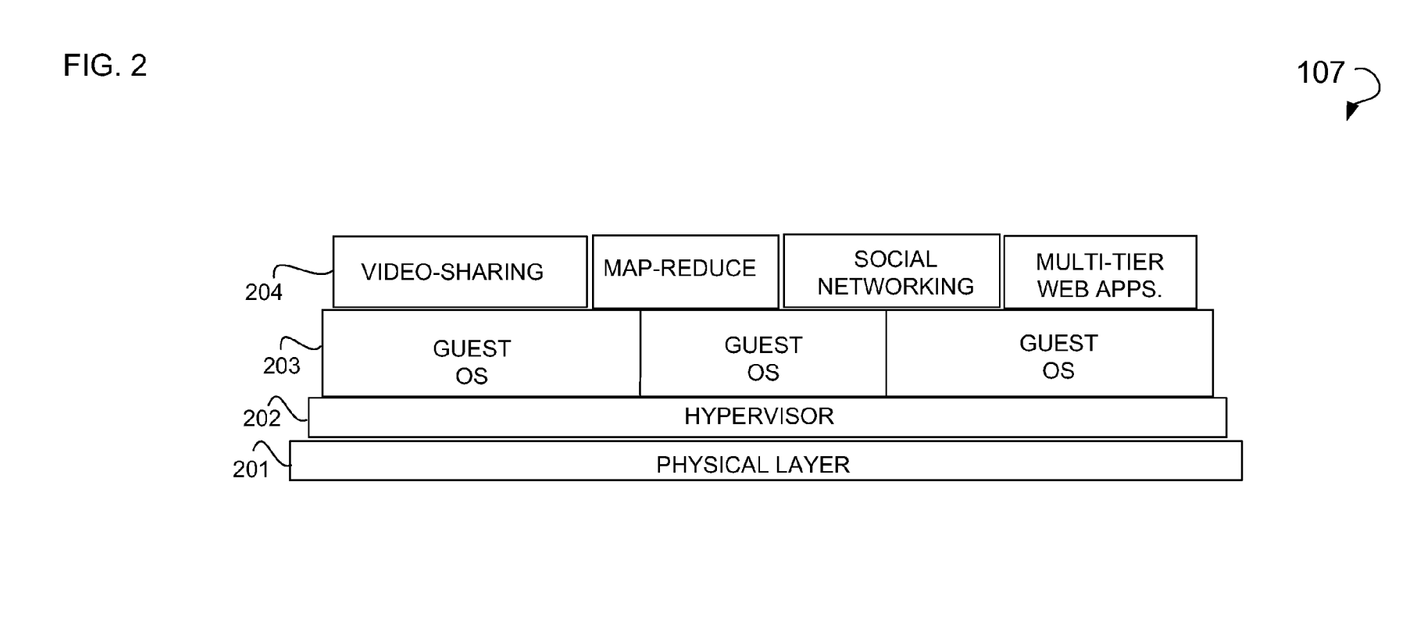
FIG. 2 is a block diagram of a core, according to an example embodiment, and the hierarchical organization of a V-Crossing that resides on this core.

FIG. 2 is a block diagram of the example core 107 and the hierarchical organization of a V-Crossing that resides on this core 107. Shown is a V-Crossing in the form of a software stack. This V-Crossing includes a physical layer that corresponds to the core 107. Residing on top of the physical layer 201 is a hypervisor 202. Residing on top of the hypervisor 202 is a plurality of guest OSs encapsulated as a VM 203. These guest OSs may be used to manage one or more application such as a video-sharing application, map-reduce application, social networking applications, or multi-tier web apps. represented at 204.

Figure 3:
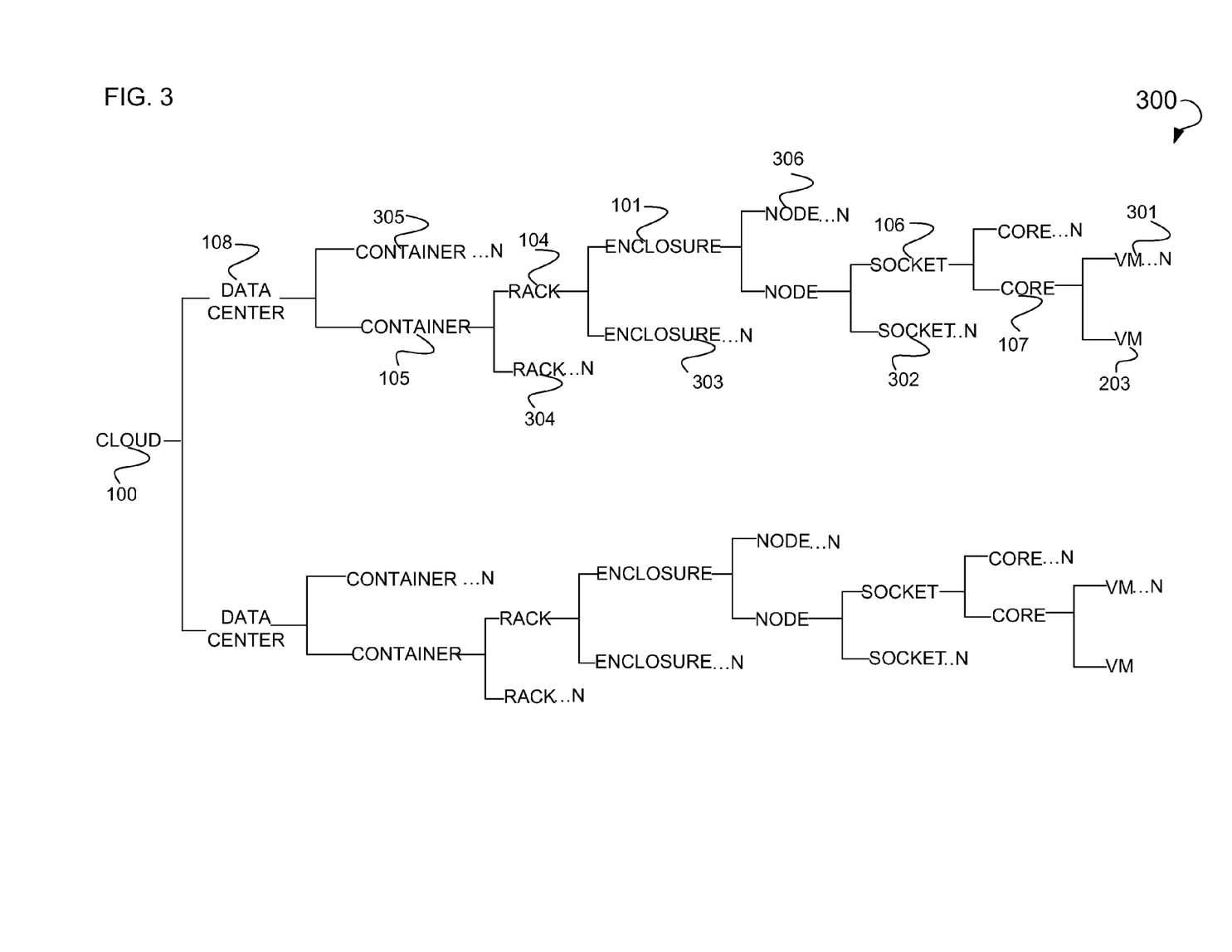
FIG. 3 is a diagram of a cloud, according to an example embodiment, representing the H-Crossing and V-Crossing hierarchies as a tree.

FIG. 3 is a diagram of an example cloud 300 representing the H-Crossing and V-Crossing hierarchies as a tree. Shown are various leaf and non-leaf (i.e., parent) nodes. Leaf nodes are referenced at 203 and 301, whereas non-leaf nodes are referenced at 101, 104, 105, 106, 107, 108, and 302-305. Also shown is a node 306 representing a plurality of compute blades. As will be discussed in more detail below, using this tree the EbAT method may be applied such that the entropies of child nodes are aggregated and used in the determination of the entropies for parent nodes. For example, again using this tree structure the EbAT method may be applied to each leaf and each non-leaf nodes.

Figure 4:
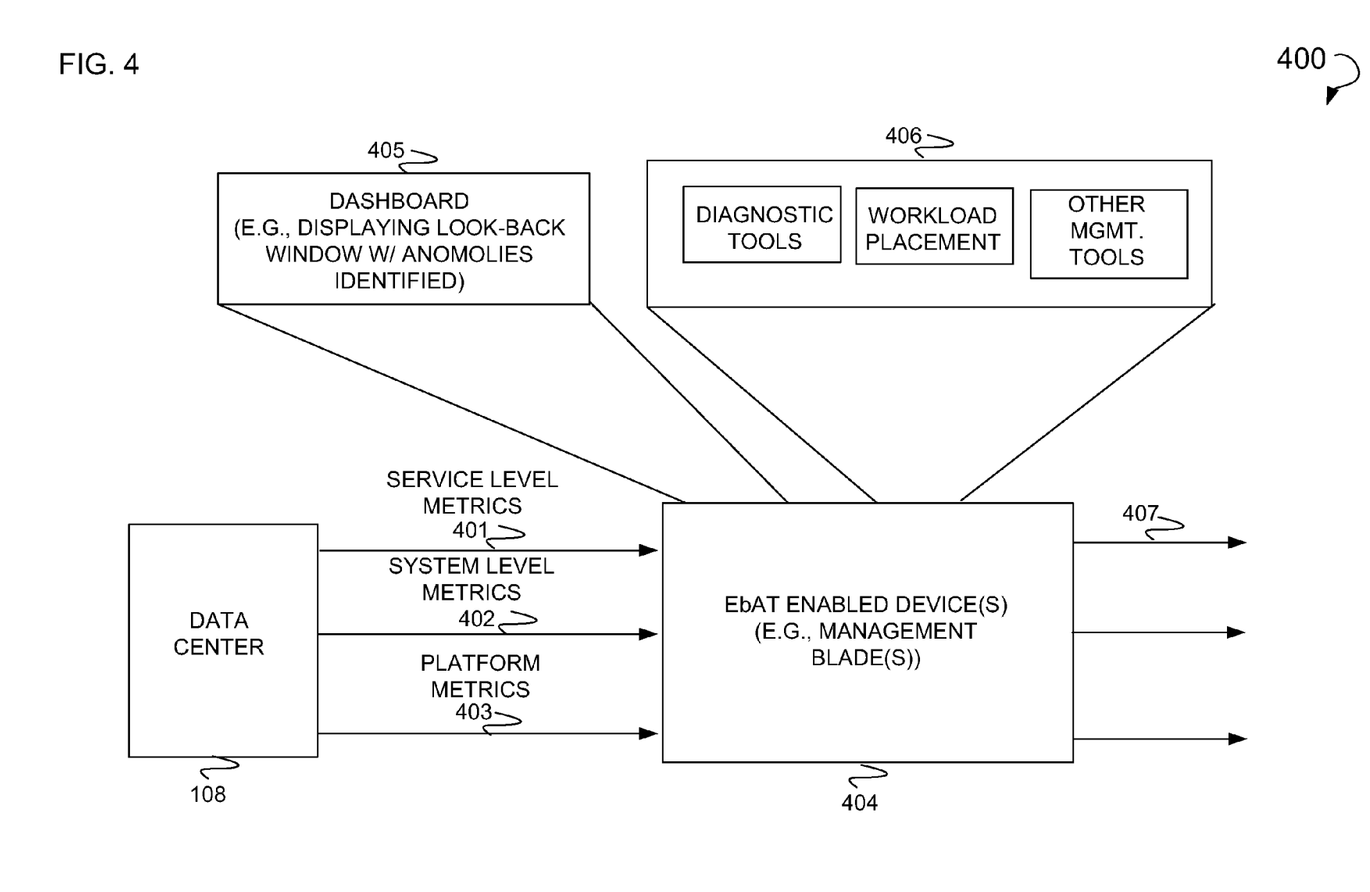
FIG. 4 is a diagram of an Entropy based Anomaly Testing (EbAT) framework, according to an example embodiment.

FIG. 4 is a diagram of an example EbAT framework 400. Shown are the data center 108 and various example metrics generated by this data center 108. These example metrics include service level metrics 401, system level metrics 402, and platform metrics 403. These metrics are provided to an EbAT enabled device or series of devices. For example, the management blade 103 is an example of an EbAT enabled device. In some example embodiments, EbAT enabled device is a plurality of devices organized such that the processing of the various metrics is distributed across the plurality of devices. Additionally, illustrated is a dashboard 405 that is used to display a look-back window reflecting a processed and displayed entropy time series. Further, illustrated is a tool set 406 in the form of various applications used in the management of anomalies associated with the H-Crossing or V-Crossing. These tools may include diagnostic tools to diagnose the root cause of the anomaly. The methods used by these diagnostic tools include Nesting/Convolution, the Pinpoint modeling service, the Magpie modeling service, Pranaali, E2EProf/System Prof, or some other suitable method. Additionally, the tool set 406 may include a workload placement tool to reallocate allocate applications or VMs, and other suitable management tools. Also shown is a data output stream 407 that includes an entropy time series. The data output stream 407 may be processed by additional method(s) to identify specific anomalies within the output data stream 407. These methods include the aforementioned spike detecting (e.g., visually or using time series analysis), signal processing or subspace method.

Figure 5:
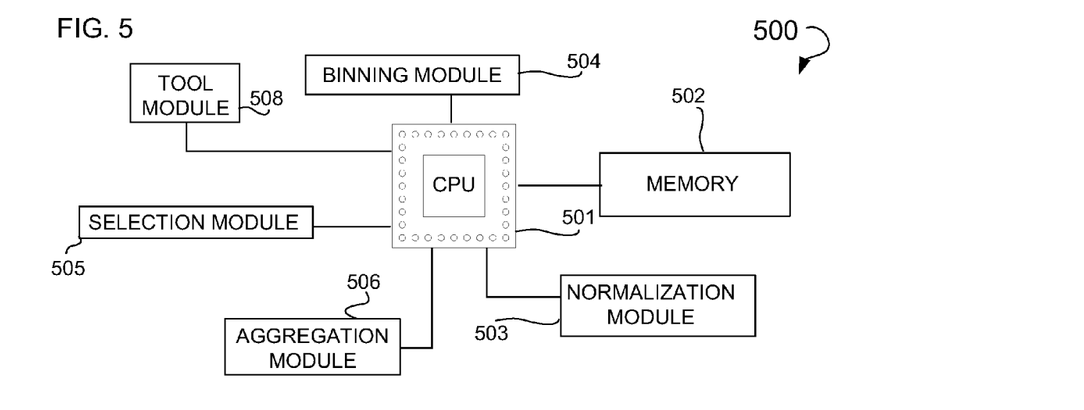
FIG. 5 is a block diagram of a non-leaf node computer system, according to an example embodiment, used for anomaly detection in data centers and across utility clouds using EbAT.

FIG. 5 is a block diagram of an example non-leaf node computer system 500 used for anomaly detection in data centers and across utility clouds using EbAT. A non-leaf node is at least one management blade on an enclosure, rack, container, data center, or cloud. Shown is a processor 501 operatively connected to a memory 502. Operatively connected as used herein may be a logical or physical connection. Operatively connected to the processor 501 may be a normalization module 503 to normalize sample data through transforming the sample data into a normalized value that is based, in part, on an identified average value for the sample data. Operatively connected to the processor 501 is a binning module 504 to bin the normalized value through transforming the normalized value into a binned value that is based, in part, on a predefined value range for a bin such that a bin value, within the predefined value range, exists for the sample data. Operatively connected to the processors 501 is a selection module 505 to identify at least one vector value from the binned value. Operatively connected to the processor 501 is an aggregation module 506 to generate an entropy time series through transforming the at least one vector value into an entropy value to be displayed as part of a look-back window. In some example embodiments, the aggregation module 506 uses the at least one vector value to generate an entropy time series represented by an entropy equation H(E) as defined below. In some example embodiments, the aggregation module 506 uses the equation H(E), as defined below, to generate an additional entropy time series value A. This additional entropy time series value may be an aggregated entropy value. In some example embodiments, the at least one child node includes a non-leaf node, or leaf node. Operatively coupled to the processor 501 is a tool module 508 to process the entropy value to be display as part of the look-back window to identify an anomaly in the sample data. In some example embodiments, the tool module 508 executes at least one of a spike detecting method, a signal processing method, or a subspace method. In some example embodiments, the entropy value is at least one of a local entropy value, or a global entropy value.

Figure 6:
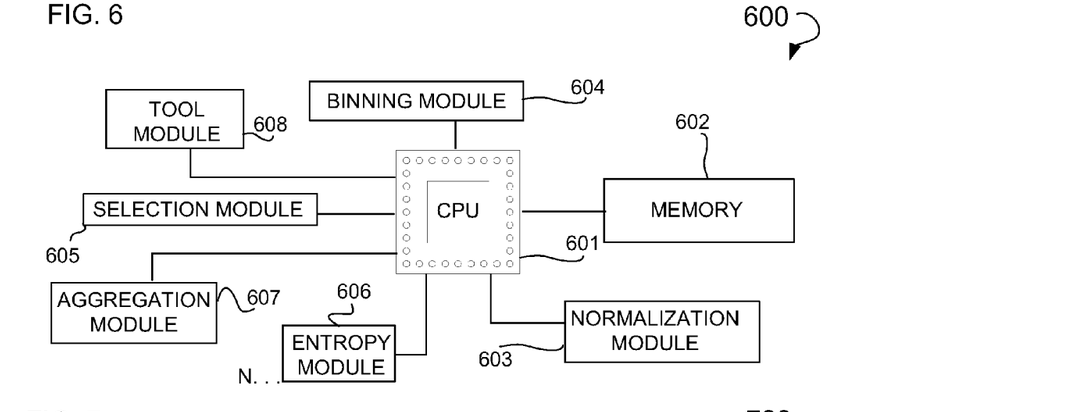
FIG. 6 is a block diagram of a leaf node computer system, according to an example embodiment, used for anomaly detection in data centers and across utility clouds, organized as a tree, using an EbAT.

FIG. 6 is a block diagram of an example leaf node computer system 600 used for anomaly detection in data centers and across utility clouds, organized as a tree, using an EbAT. A leaf node may be a service processor, or plurality of processors running on a compute blade. Shown is a processor 601 operatively connected to a memory 602. Operatively coupled to the processor 601 is a normalization module 603 to normalize sample data through transforming the sample data into a normalized value that is based, in part, on an identified average value for the sample data, the sample data associated with a leaf of a tree which represents an organization of a utility cloud. Operatively coupled to processor 601 is a binning module 604 to bin the normalized value through transforming the normalized value into a binned value that is based, in part, on a predefined value range for a bin such that a bin value, within the predefined value range, exists for the sample data associated with the leaf of the tree. Operatively coupled to the processor 601 is a selection module 605 to identify at least one vector value from the binned value, the at least one vector value corresponding to the leaf of the tree. Operatively connected to the processor 601 is a entropy module 606 to generate an entropy time series through transforming the at least one vector value into an entropy value to be displayed as part of a look-back window, the look-back window associated with the leaf of the tree. As illustrated by "N . . . ", there is an entropy module 606 for each VM within the compute blade of the cloud 300. Also shown is an aggregation module 607 to calculate the entropy of the entropy time series generated from each of the plurality of VMs (e.g., child nodes) within a compute blade of the cloud 300. The equation A (illustrated below) may be used to calculate the entropy of the entropy time series. In some example embodiments, the H-Crossing hierarchy is made up of at least one component that includes a data center, a container, a rack, an enclosure, a node, a socket, or a core. Additionally, the V-Crossing hierarchy may be is made up of at least one component that includes a physical platform, a hypervisor, a VM, or an application. Operatively connected to the processor 601 is a tool module 608 to process the entropy time series using at least one of a spike detecting, signal processing, or a subspace method.

Figure 7:
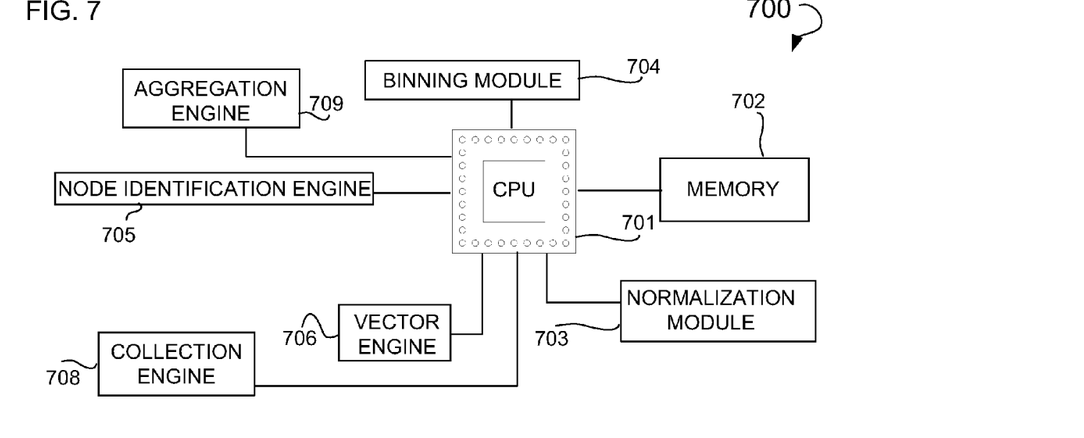
FIG. 7 is a block diagram of a computer system, according to an example embodiment, used for anomaly detection in data centers and across utility cloud using an EbAT to aggregate an entropy time series.

FIG. 7 is a block diagram of an example computer system 700 used for anomaly detection in data centers and across utility cloud using an EbAT to aggregate an entropy time series. This computer system 700 may be a management blade 103. Shown is a processor 701 operatively connected to a memory 702. Operatively connected to the processor 701 is a normalization module 703 to normalize sample data through transforming the sample data into a normalized value that is based, in part, on an identified average value for the sample data, the sample data associated with a node of a tree. Operatively connected to the processor 701 is a binning module 704 to bin the normalized value through transforming the normalized value into a binned value that is based, in part, on a predefined value range for a bin such that a bin value, within the predefined value range, exists for the sample data associated with the node of the tree. Operatively connected to the processor 701 is a node identification engine 705 to determine the node of the tree is a parent. Operatively connected to the processor 701 is a vector engine 706 to identify at least one vector value from the binned value, the at least one vector value corresponding to at least one child of the parent. Operatively connected to the processor 701 is an entropy engine 707 to generate an aggregated entropy time series for the parent through transforming all of the vector values for all of the children into the aggregated entropy time series. In some example embodiments, transforming includes the creation of the aggregated times series from a global entropy that is, in turn, generated from the entropy of child entropies. Additionally, in some example embodiments, transforming includes the creation of the aggregated time series through the use us of the equation for A as illustrated below. Operatively connected to the processor 701 is a collection engine (e.g., a receiver) 708 to collect the sample data from each node in the tree. Operatively connected to the processor 701 is an aggregation engine 709 to transform the aggregated entropy time series to a plurality of points in a graph to be displayed.

Figure 8:
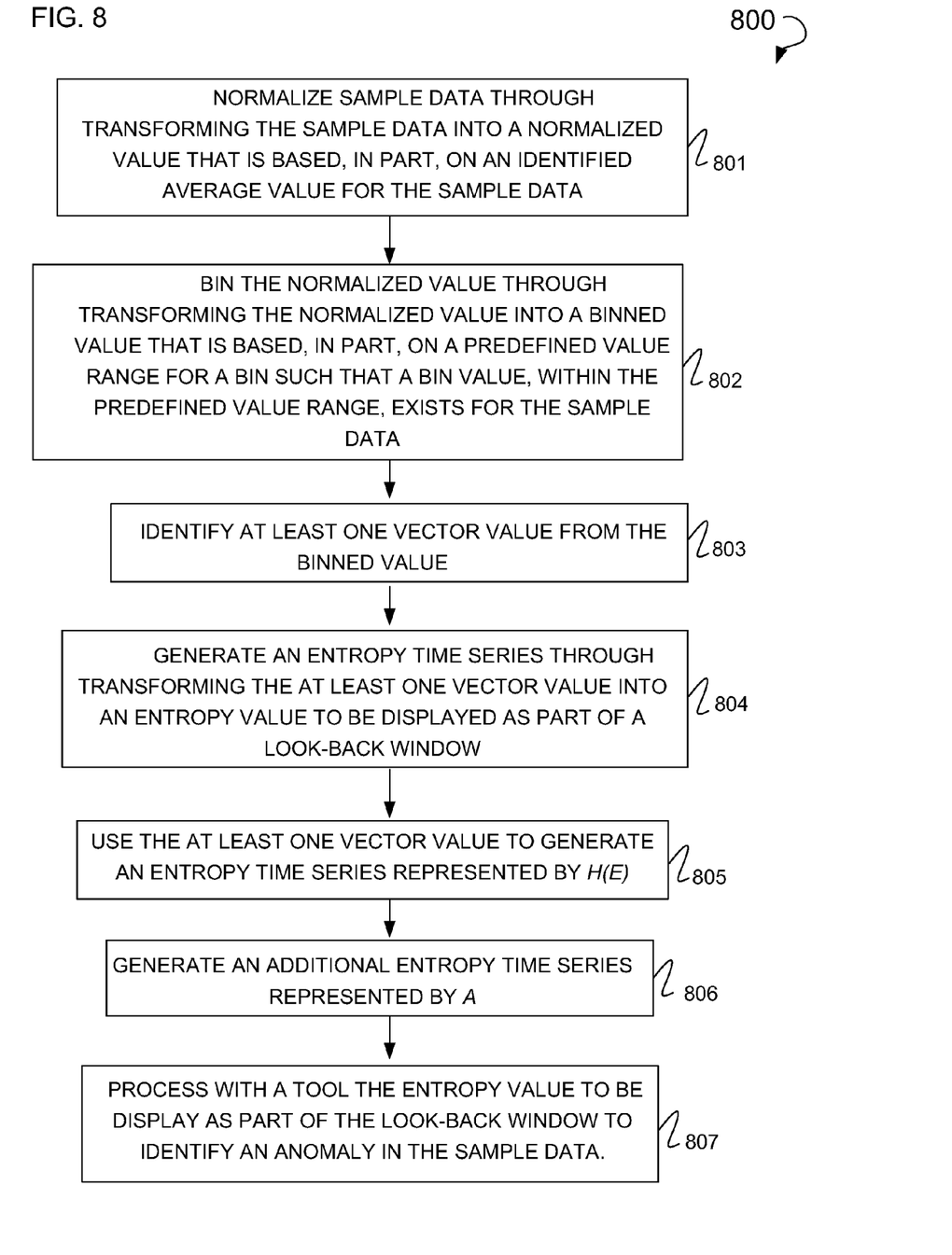
FIG. 8 is a flow chart illustrating a method, according to an example embodiment, executed for anomaly detection in a non-leaf node using EbAT.

FIG. 8 is a flow chart illustrating an example method 800 executed for anomaly detection in a non-leaf node using EbAT. This method 800 may be executed by the management blade 103. Operation 801 is executed the normalization module 503 to normalize sample data through transforming the sample data into a normalized value that is based, in part, on an identified average value for the sample data. Operation 802 is executed by the binning module 504 to bin the normalized value through transforming the normalized value into a binned value that is based, in part, on a predefined value range for a bin such that a bin value, within the predefined value range, exists for the sample data. Operation 803 is executed by the selection module 505 to identify at least one vector value from the binned value. Operation 804 is executed by the aggregation module 506 to generate an entropy time series through transforming the at least one vector value into an entropy value to be displayed as part of a look-back window. Operation 805 is also executed by the aggregation module 506 and uses the at least one vector value to generate an entropy time series represented by H(E) as defined below. Operations 804 and 805 may be executed in the alternative of one another, or together. Operation 806 is executed by the aggregation module 506 to generate an additional entropy time series represented by A as defined below. In some example embodiments, the at least one child node includes a non-leaf node, or a leaf node. Operation 807 is executed by the tool module 508 to process entropy value to be display as part of the look-back window to identify an anomaly in the sample data. In some example embodiments, the tool includes at least one of a spike detecting method, a signal processing method, or a subspace method. In some example embodiments, the entropy value is at least one of a local entropy value, or a global entropy value. In some example embodiments, this method 800 is executed by a single operating system in a non-virtualized environment.

Figure 9:
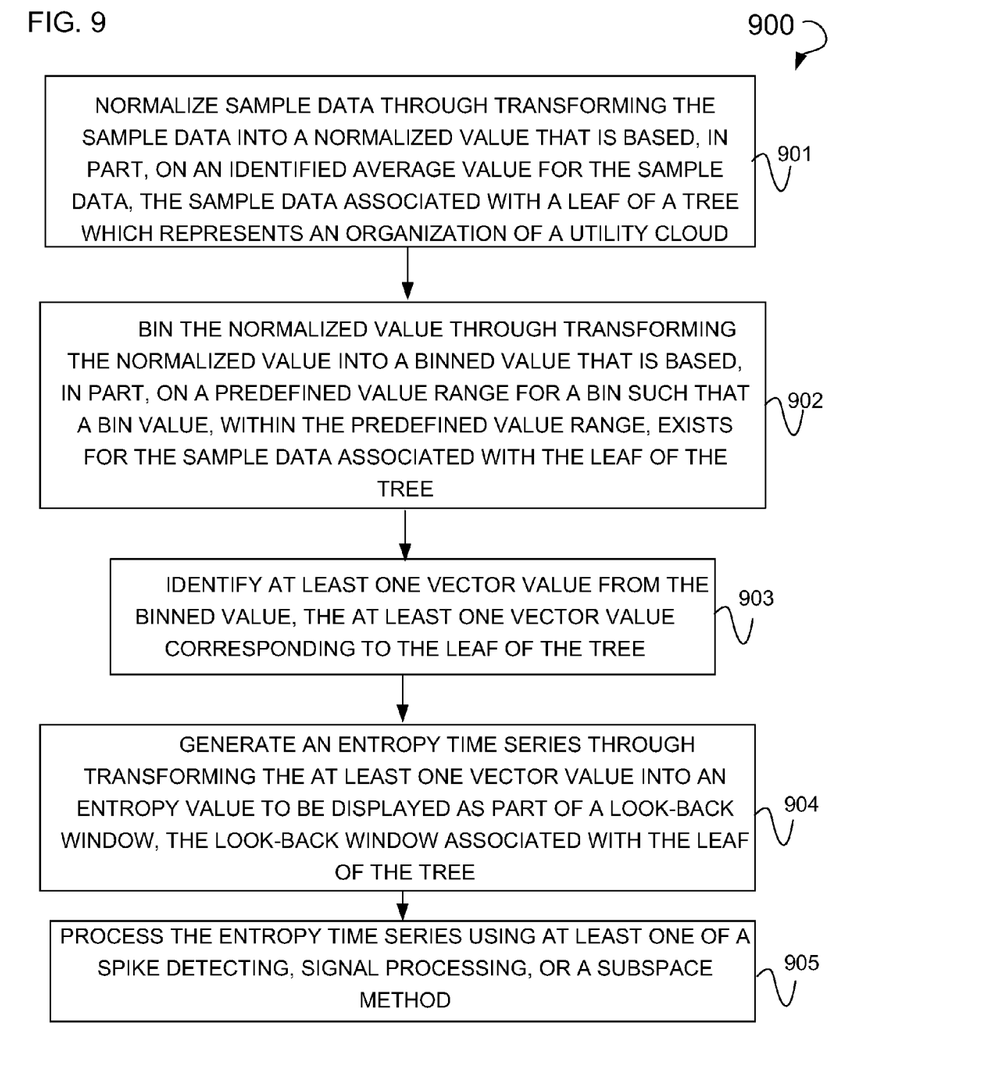
FIG. 9 is a flow chart illustrating a method, according to an example embodiment, used for anomaly detection in a leaf node using an EbAT.

FIG. 9 is a flow chart illustrating an example method 900 used for anomaly detection in leaf node using an EbAT. This method 900 may be executed by a leaf node within the cloud 300. Operation 901 is executed by the normalization module 603 to normalize sample data through transforming the sample data into a normalized value that is based, in part, on an identified average value for the sample data, the sample data associated with a leaf of a tree which represents an organization of a utility cloud. Operation 902 is executed by the binning module 604 to bin the normalized value through transforming the normalized value into a binned value that is based, in part, on a predefined value range for a bin such that a bin value, within the predefined value range, exists for the sample data associated with the leaf of the tree. Operation 903 is executed by the selection module 605 to identify at least one vector value from the binned value, the at least one vector value corresponding to the leaf of the tree. Operation 904 is executed by the entropy module 606 to generate an entropy time series through transforming the at least one vector value into an entropy value to be displayed as part of a look-back window, the look-back window associated with the leaf of the tree. This operation 904 may be iteratively executed for each guest OS (i.e., VM) to generate an entropy time series for each guest OS. In some example embodiments, an operation (not pictured) is executed by an aggregation module 607 to calculate the entropy of the entropy time series generated from a each of the plurality of VMs (e.g., child nodes) within a compute blade of the cloud 300. In some example embodiments, the tree includes at least one of an H-Crossing hierarchy or a V-Crossing hierarchy. In some example embodiments, the H-Crossing hierarchy is made up of at least one component that includes a data center, a container, a rack, an enclosure, a node, a socket, or a core. In some example embodiments, the V-Crossing hierarchy is made up of at least one component that includes a physical platform, a hypervisor, a VM, or an application. In some example embodiments, the entropy value is an entropy of the entropy time series generated from each VM. Operation 905 is executed by the tool module 608 to process the entropy time series using at least one of a spike detecting, signal processing, or a subspace method. In some example embodiments, this method 900 is executed by a single operating system in a non-virtualized environment.

Figure 10:
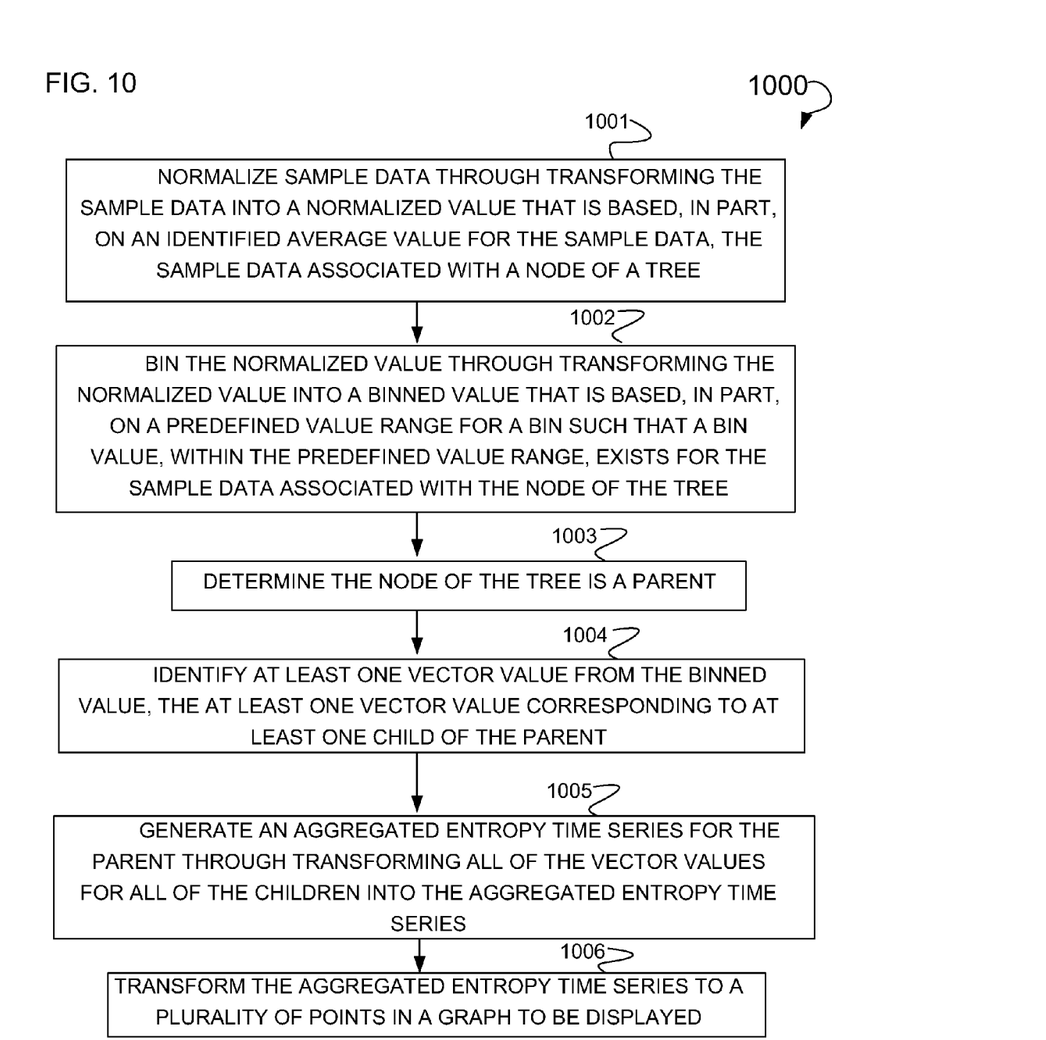
FIG. 10 is a flow chart illustrating the execution of a method, according to an example embodiment, used for anomaly detection in data centers and across utility cloud using an EbAT to aggregate an entropy time series.

FIG. 10 is a flow chart illustrating the execution of an example method 1000 used for anomaly detection in data centers and across utility cloud using an EbAT to aggregate an entropy time series. This method 1000 may be executed by a management blade 103. Operation 1001 is executed by the normalization module 703 to normalize sample data through transforming the sample data into a normalized value that is based, in part, on an identified average value for the sample data, the sample data associated with a node of a tree. Operation 1002 is executed by the binning module 704 to bin the normalized value through transforming the normalized value into a binned value that is based, in part, on a predefined value range for a bin such that a bin value, within the predefined value range, exists for the sample data associated with the node of the tree. Operation 1003 is executed by the node identification module 705 to determine the node of the tree is a parent. Operation 1004 is executed by the vector engine 706 to identify at least one vector value from the binned value, the at least one vector value corresponding to at least one child of the parent. Operation 1005 is executed to generate an aggregated entropy time series for the parent through transforming all of the vector values for all of the children into the aggregated entropy time series. In some example embodiments, transforming includes the creation of the aggregated times series from a global entropy that is, in turn, generated from the entropy of child entropies. Additionally, in some example embodiments, transforming includes the creation of the aggregated time series through the use of the equation for A as illustrated below. Operation 1006 is executed by the aggregation engine 709 to transform the aggregated entropy time series to a plurality of points in a graph to be displayed. In some example embodiments, this method 1000 is executed by a single operating system in a non-virtualized environment.

Figure 11:
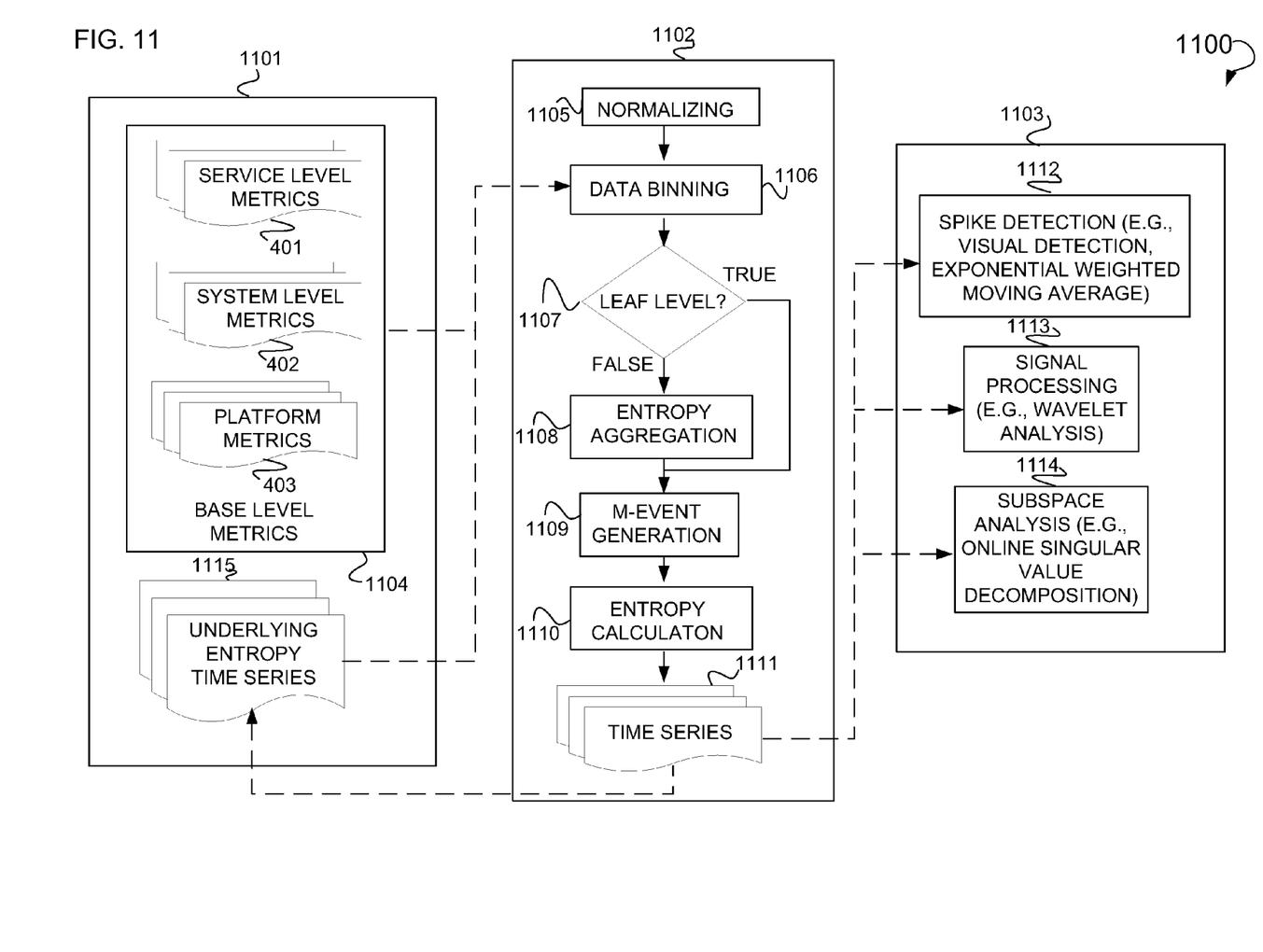
FIG. 11 is a flow chart of a method, according to an example embodiment, illustrating the generation a look-back window using the EbAT method and framework associated therewith.

FIG. 11 is a flow chart of an example method 1100 illustrating the generation a look-back window using the EbAT method and framework associated therewith. This method 1100 may be executed by one or more management blades 103, or some other suitable computer system. Shown is an operation 1101 that is executed by the leaf or non-leaf nodes (e.g., enclosures 101-102) to collect metrics in the form of samples from one or more of the H-Crossing or V-Crossing components. A collection operation 1104 exists as part of these leaf or non-leaf nodes to collect these metrics. These samples include one or more of the previously illustrated service level metrics, system level metrics, and platform level metrics, referenced respectively as 401, 402, and 403. In some example embodiments, through the execution of operation 1101, multiple types of metric can be collected simultaneously (e.g., CPU utilization, memory utilization and VBD read/write in each monitoring sample). Additionally, the metrics values of child components can be collected simultaneously by non-leaf components, and discussed below the entropy value calculated for each child component. (See generally FIG. 3 describing the organization of H-Crossing and V-Crossing component as a tree with leaf (child), and non-leaf components.) Operations 1105 and 1106 are executed as part of a preprocessing regime that preprocesses the samples prior to the determination of an entropy value(s).

Operation 1102 is executed to generate an entropy time series 1111 and includes the execution of operations 1105-1110. This operation 1102 may be executed by the computer systems 500, 600, or 700. Operation 1105 is executed to transform a sample value to a normalized value by dividing the sample value by the mean of all values of the same type in the current look-back window. Operation 1106 is executed to facilitate data binning, whereby each of the normalized sample values are hashed to a bin of size m+1. A bin, as used herein, is an array, hash table, or other suitable data structure. In data binning, a predefined value range [0, r] is initialized as part of the bin, and split it into m equal-sized bins indexed from 0 to m−1. A second bin is initialized and indexed m which captures values larger than r. Both m and r are predetermined statistically but are configurable parameters to the method. Each of the normalized values from generation through the execution of operation 1105 is put into a specific bin. If the value is greater than r, then it is placed in the bin with index m, else it is put in a bin with index, the floor of samplevalue/(r/m). Upon the execution of operation 1106, each of the normalized values is associated with a bin index number. Each sample value can be understood as either a local sample of global sample based upon the following table—

|  | Btj | k |
|---|---|---|
| Global | Bin index of $j^{th}$ child entropy | Total # of children |
| Local | Bin index of $j^{th}$ local metric | Total # of local metrics |

Decision operation 1107 is executed to determine whether the component for which the sample is provided is a leaf-level component. In cases where decision operation 1107 evaluates to "true," an operation 1109 is executed. In cases where decision operation 1107 evaluates to "false," an operation 1108 is executed. Operation 1109 is executed to transform the binned index values into a single vector for each sample, referenced herein as m-event creation. Specifically, an m-event of a component at sample t, an observation Et is formulated as the following vector description:

$Et=<Bt1,Bt2...,Btj,...Btk>$, where $Btj$ and $k$ are defined in the above table.

One example restriction is that an entropy value and a local metric value should not be in the same vector of an m-event. According to the above definitions, at each component except for leaves, there may be two types of m-events: 1) global m-events aggregating entropies of its sub tree, or 2) local m-events recording local metric transformation values (e.g., bin index numbers). Within a specific component, the template of m-events is fixed (i.e., the types and the order of raw metrics in the m-event (i.e., local or global) vector are fixed). Two m-events, Ea and Eb have the same vector value if they are created on the same component and $\forall j \in [1, k]$, Baj=Bbj. As illustrated above, an m-event is actually the representation of a monitoring sample. On each component, there will be n m-events in the look-back window with size "N."

Operation 1108 is executed to perform entropy aggregation for a plurality of H-Crossing or V-Crossing components. To understand entropy aggregation represented as A, it is necessary to calculate an entropy value for a set of samples (i.e., represented as the above referenced vector description) that make up the observation E for a look-back window with size n samples. This entropy value represented as H(E) is used in the calculation of A. The outcomes of E are v m-event vector values {e1, e2 . . . , ev} where v is not equal to n when there are m-events with the same value in the n samples. For each of these v values, a count of the number of occurrence of that ei in the n samples is maintained. This count is designated ni and represents the number of m-events with vector value ei. Operation 1108 is executed to calculate H(E) using the following formula:

$$H(E) = -\sum_{i=1}^{v} \frac{ni}{n} \log \frac{ni}{n}$$

By calculating H(E) for the look-back window, a global and local entropy time series is generated illustrating the metric distributions for that look-back window. Since, the look-back window is refreshed sample by sample, H(E) is calculated at every monitoring sample for the corresponding look-back window. In the case of local entropy calculation, the m-events represent the pre-processing results of the raw metrics. In the case of the global entropy calculation, the m-events represent the pre-processing results of the child entropy time series. In these example cases, an entropy of entropy time series for H(E) can be calculated using child entropy time series. An alternate calculation of global entropy can be determined using the following equation:

$$A = \sum_{i=1}^{c} Hi + \prod_{i=1}^{c} Hi$$

The formula reflects the combination of sum and product of the individual child entropies, where c is the number of children nodes (e.g., VMs on the same core), and Hi represents the local entropy of the child i. Operation 1110 is executed to calculate an entropy value H(E) as illustrated above. In cases where operation 1110 is executed, the entropy value for a leaf or non-leaf node is calculated. Entropy module 606 may be used to execute operation 1110, while aggregation modules 506, 607, and 709 may be used to execute operation 1108 to determine A. Through the execution of operations 1105-1110, an entropy time series 1111 is generated illustrating, for example, entropy or aggregate entropy over a sample time, CPU usage over a sample time, or some other suitable time series. Additionally, through the execution of operation 1110, an underlying entropy time series 1115 is generated and stored for future use. Operations 1107 and 1108 may be executed so as to determine H(E) and A for a leaf and non-leaf components.

Operation 1103 is executed to perform entropy time series processing using one or more example operations 1112-1114. This operation 1103 may be executed by one or more of the computer systems 500, 600, or 700. Further, the operation 1103 may be executed by a client device of the computer systems 500, 600, or 700. The client device maybe a cell phone, Personal Digital Assistant (PDA), computer system, or other device operatively connected to the computer systems 500, 600, or 700. The client device may have a dashboard 405 in the form of a web browser or other interpreter capable of interpreting a Hyper Text Markup Language (HTML), or an eXtensible Markup Language (XML). Operatively connected includes a physical or logical connection. In some example embodiments, the entropy time series 1111 is processing using one or more of the operations 1112-1114. Operation 1112 processes the entropy times series 1111 using spike detection. Operation 1113 processes the entropy time series 1113 using signal processing (e.g., wavelet analysis). Operation 1114 processes the entropy time series 1111 using sub space analysis. The selection of operations 1112-1114 may be performed through the use of a Graphical User Interface (GUI), Command Line Interface (CLI), or may be pre-determined by a system administrator or other suitable individual. This selection may be performed using the above referenced client device.

Figure 12:
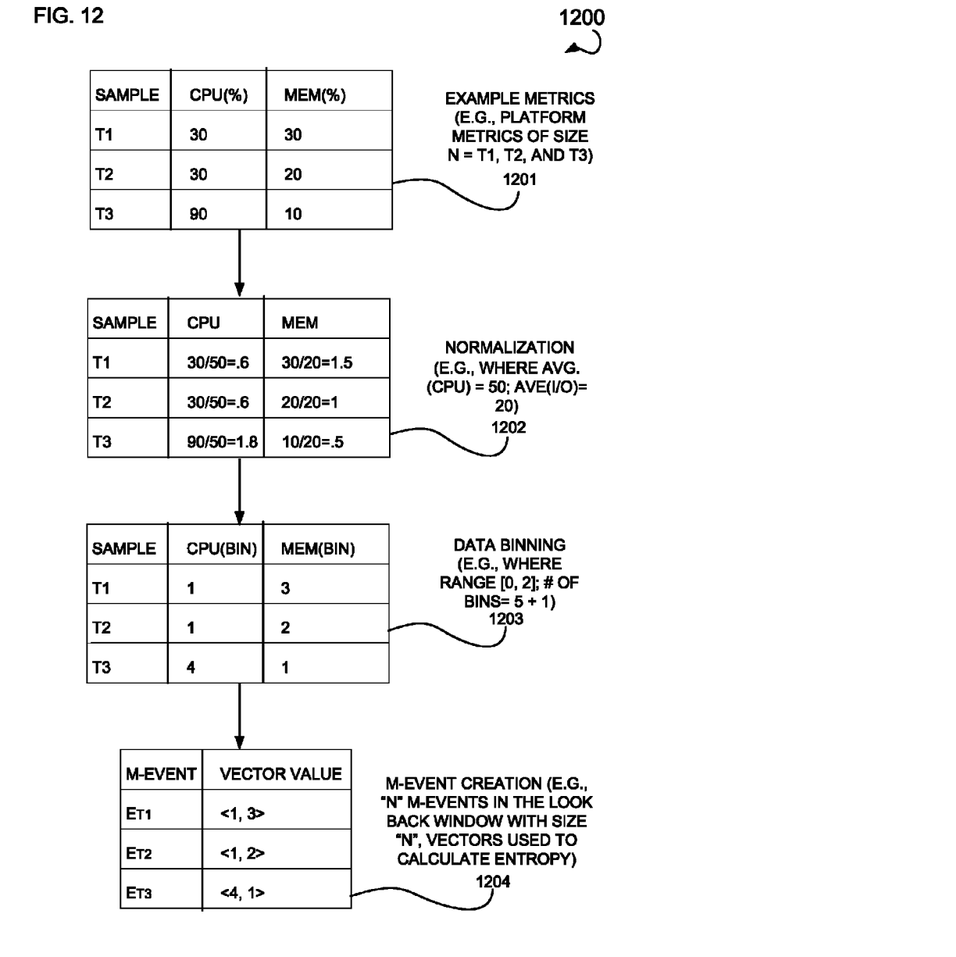
FIG. 12 is a diagram illustrating a tabular representation, according to an example embodiment, of the preprocessing of sample data, in the form of CPU and memory utilization metrics, for the purpose of generating a look-back window.

FIG. 12 is a diagram illustrating a tabular representation 1200 of the preprocessing of sample data, in the form of CPU and memory utilization metrics, for the purpose of generating a look-back window. As shown above, operations 1105 and 1106, and 1109 are executed to preprocess the sample data. Table 1201 includes samples T1-T3 in the form of platform metrics for the percentage of CPU capacity utilized, and the percentage of available memory utilized. Aggregation of the sample data in table 1201 is performed through the execution of operation 1101. Table 1202 includes normalized data for each of the samples T1-T3, where the quotient of the sample and average for each of samples is determined. The normalized data in table 1202 is generated through the execution of operation 1105. Table 1203 includes binned data, where the normalized data of table 1202 is hashed to fall within a specific range of bin values. Operation 1106 is executed to generate the binned data of table 1203. Table 1204 includes vector for the binned values of table 1203, where an m-event vector values are used to calculate the entropy for each vector. For example, applying the above illustrated equation used to calculate H(E), the following expression can be generated from 3 events and the vector <1,3>:

$$-(\tfrac{1}{3}\log(\tfrac{1}{3}) + \tfrac{1}{3}\log(\tfrac{1}{3}) + \tfrac{1}{3}\log(\tfrac{1}{3}))$$

Additionally, as discussed above, this H(E) value may be used to calculate A.

Figure 13:
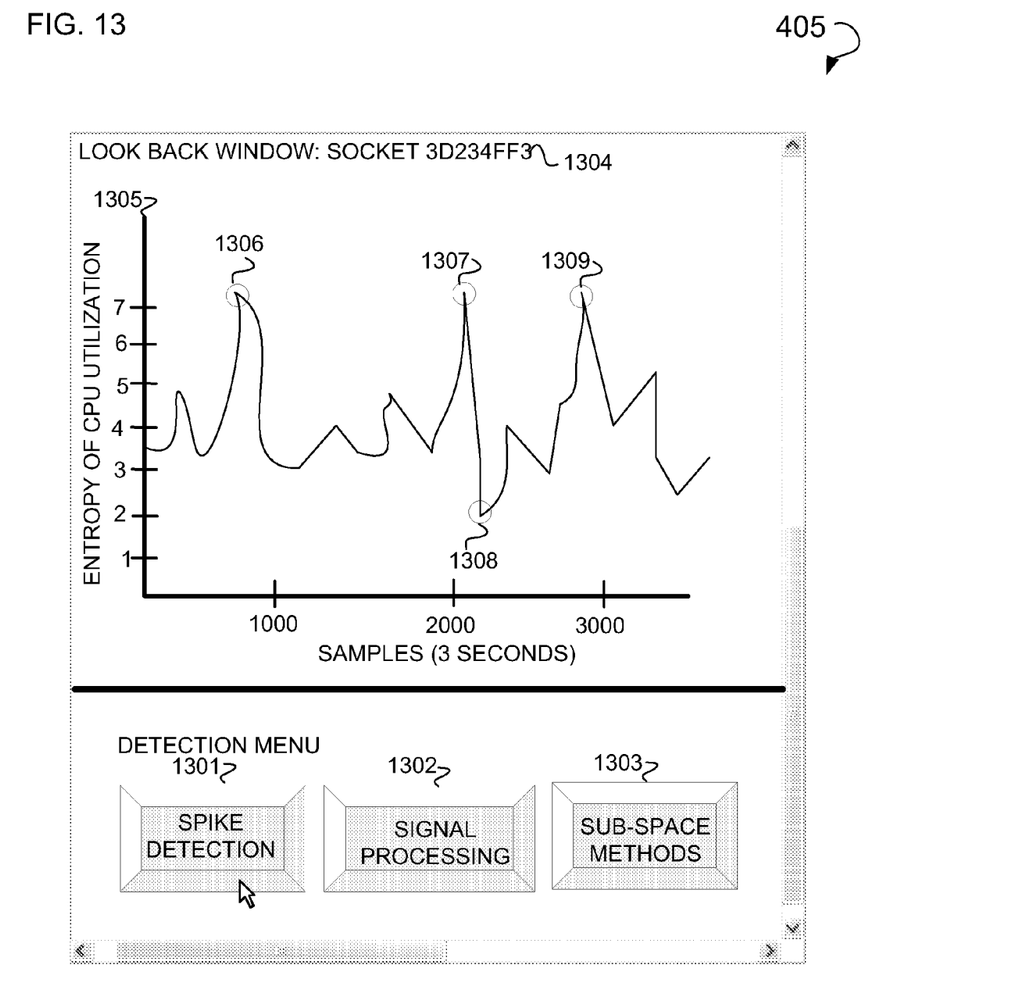
FIG. 13 is a Graphical User Interface (GUI), according to an example embodiment, in the form of the dashboard used to facilitate entropy time series processing.

FIG. 13 is an example GUI in the form of the dashboard 405 used to facilitate entropy time series processing. This GUI may reside as part of the management blade 103. Illustrated is a detection menu that includes a selection mechanism, in the form of a buttons 1301-1303, that is used to select a tool, such as spike detecting (e.g., visually or using time series analysis), signal processing or a subspace method, for entropy time series processing. Further illustrated is a look-back window that includes a component identifier field 1304 that displays an identifier for the particular component for which an entropy times series has been generated. Here, a socket identified via the hexadecimal value of "3D234FF3" has been identified. Other identifiers for components include a Media Access Control (MAC) identifier, and Internet Protocol (IP) address, or some other suitable type identifier. Also shown is a look-back window 1305 displaying an entropy time series that has been processed using a spike detection tool. Shown are various spikes in the time series that are denoted at 1306-1309. These spikes illustrate possible anomalies in the entropy of CPU utilization.

Figure 14:
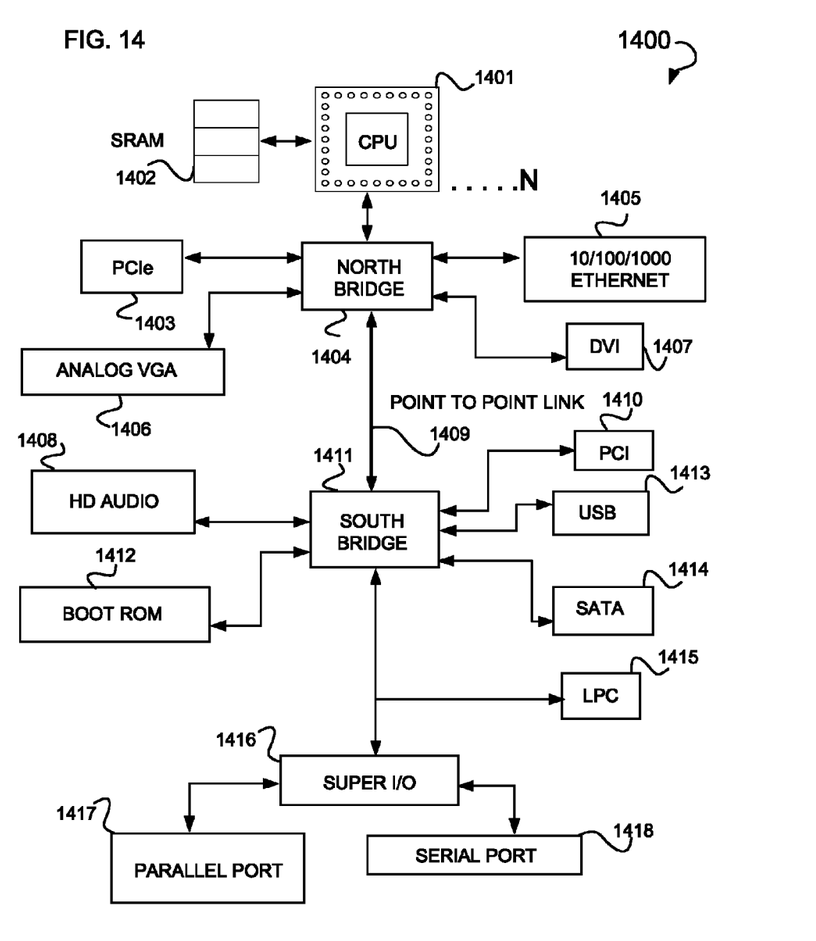
FIG. 14 is a diagram of a computer system, according to an example embodiment.

FIG. 14 is a diagram of an example computer system 1400. Shown is a CPU 1401. The processor die 201 may be a CPU 1401. In some example embodiments, a plurality of CPU may be implemented on the computer system 1400 in the form of a plurality of core (e.g., a multi-core computer system), or in some other suitable configuration. Some example CPUs include the x86 series CPU. Operatively connected to the CPU 1401 is Static Random Access Memory (SRAM) 1402. Operatively connected includes a physical or logical connection such as, for example, a point to point connection, an optical connection, a bus connection or some other suitable connection. A North Bridge 1404 is shown, also known as a Memory Controller Hub (MCH), or an Integrated Memory Controller (IMC), that handles communication between the CPU and PCIe, Dynamic Random Access Memory (DRAM), and the South Bridge. An ethernet port 1405 is shown that is operatively connected to the North Bridge 1404. A Digital Visual Interface (DVI) port 1407 is shown that is operatively connected to the North Bridge 1404. Additionally, an analog Video Graphics Array (VGA) port 1406 is shown that is operatively connected to the North Bridge 1404. Connecting the North Bridge 1404 and the South Bridge 1411 is a point to point link 1409. In some example embodiments, the point to point link 1409 is replaced with one of the above referenced physical or logical connections. A South Bridge 1411, also known as an I/O Controller Hub (ICH) or a Platform Controller Hub (PCH), is also illustrated. A PCIe port 1403 is shown that provides a computer expansion port for connection to graphics cards and associated GPUs. Operatively connected to the South Bridge 1411 are a High Definition (HD) audio port 1408, boot RAM port 1412, PCI port 1410, Universal Serial Bus (USB) port 1413, a port for a Serial Advanced Technology Attachment (SATA) 1414, and a port for a Low Pin Count (LPC) bus 1415. Operatively connected to the South Bridge 1411 is a Super Input/Output (I/O) controller 1416 to provide an interface for low-bandwidth devices (e.g., keyboard, mouse, serial ports, parallel ports, disk controllers). Operatively connected to the Super I/O controller 1416 is a parallel port 1417, and a serial port 1418.

The SATA port 1414 may interface with a persistent storage medium (e.g., an optical storage devices, or magnetic storage device) that includes a machine-readable medium on which is stored one or more sets of instructions and data structures (e.g., software) embodying or utilized by any one or more of the methodologies or functions illustrated herein. The software may also reside, completely or at least partially, within the SRAM 1402 and/or within the CPU 1401 during execution thereof by the computer system 1400. The instructions may further be transmitted or received over the 10/100/1000 ethernet port 1405, USB port 1413 or some other suitable port illustrated herein.

In some example embodiments, a removable physical storage medium is shown to be a single medium, and the term "machine-readable medium" should be taken to include a single medium or multiple medium (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

The above illustrated methods include data and instructions (of the software) that are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the "true" spirit and scope of the invention.

What are claimed are:

1. A computer implemented method comprising:
    normalizing sample data through transforming the sample data into a normalized value that is based, in part, on an identified average value for the sample data;
    binning the normalized value through transforming the normalized value into a binned value that is based, in part, on a predefined value range for a bin such that a bin value, within the predefined value range, exists for the sample data;
    identifying at least one vector value from the binned value;
    generating an entropy time series through transforming the at least one vector value into an entropy value to be displayed as part of a look-back window using the equation:

$$H(E) = -\sum_{i=1}^{v} \frac{ni}{n} \log \frac{ni}{n}$$

where v is the total number of unique vector values in n samples and ni is the count vector value in the n samples; and
    using H(E) to generate an additional entropy time series represented by an additional equation:

$$A = \sum_{i=1}^{c} Hi + \prod_{i=1}^{c} Hi$$

where c represents at least one child node, and Hi represents H(E).

2. The computer implemented method of claim 1, wherein the at least one child node includes at least one of a non-leaf node, or a leaf node.

3. The computer implemented method of claim 1, further comprising processing with a tool the entropy value to be display as part of the look-back window to identify an anomaly in the sample data.

4. The computer implemented method of claim 3, wherein the tool includes at least one of a spike detecting method, a signal processing method, or a subspace method.

5. The computer implemented method of claim 1, wherein the entropy value is at least one of a local entropy value, or a global entropy value.

6. A computer implemented method comprising:
    normalizing sample data through transforming the sample data into a normalized value that is based, in part, on an identified average value for the sample data, the sample data associated with a leaf of a tree which represents an organization of a utility cloud;
    binning the normalized value through transforming the normalized value into a binned value that is based, in part, on a predefined value range for a bin such that a bin value, within the predefined value range, exists for the sample data associated with the leaf of the tree;
    identifying at least one vector value from the binned value, the at least one vector value corresponding to the leaf of the tree;
    generating an entropy time series through transforming the at least one vector value into an entropy value to be displayed as part of a look-back window, the look-back window associated with the leaf of the tree using the equation:

$$H(E) = -\sum_{i=1}^{v} \frac{ni}{n} \log \frac{ni}{n}$$

where v is the total number of unique vector values in n samples and ni is the count vector value in the n samples; and using H(E) to generate an additional entropy time series represented by an additional equation:

$$A = \sum_{i=1}^{c} Hi + \prod_{i=1}^{c} Hi$$

where c represents at least one child node, and Hi represents H(E).

7. The computer implemented method of claim 6, wherein the tree includes at least one of an H-Crossing hierarchy or a V-Crossing hierarchy.

8. The computer implemented method of claim 7, wherein the H-Crossing hierarchy is made up of at least one component that includes a data center, a container, a rack, an enclosure, a node, a socket, or a core.

9. The computer implemented method of claim 7, wherein the V-Crossing hierarchy is made up of at least one component that includes a physical platform, a hypervisor, a Virtual Machine (VM), or an application.

10. The computer implemented method of claim 9, wherein the entropy value is an entropy of the entropy time series generated from each VM.

11. The computer implemented method of claim 6, further comprising identifying anomalies in the entropy time series using at least one of spike detecting, signal processing, or a subspace method.

12. A computer implemented method comprising:
normalizing sample data through transforming the sample data into a normalized value that is based, in part, on an identified average value for the sample data;
binning the normalized value through transforming the normalized value into a binned value that is based, in part, on a predefined value range for a bin such that a bin value, within the predefined value range, exists for the sample data;
identifying at least one vector value from the binned value;
generating an entropy time series through transforming the at least one vector value into an entropy value to be displayed as part of a look-back window using the equation:

$$H(E) = -\sum_{i=1}^{v} \frac{ni}{n} \log \frac{ni}{n}$$

where v is the total number of unique vector values in n samples and ni is the count vector value in the n samples; and using H(E) to generate an additional entropy time series represented by an additional equation:

$$A = \sum_{i=1}^{c} Hi + \prod_{i=1}^{c} Hi$$

where c represents at least one child node, and Hi represents H(E), wherein the at least one child node includes at least one of a non-leaf node, or a leaf node.

13. The computer implemented method of claim 12, further comprising processing with a tool the entropy value to be display as part of the look-back window to identify an anomaly in the sample data.

14. The computer implemented method of claim 13, wherein the tool includes at least one of a spike detecting method, a signal processing method, or a subspace method.

15. The computer implemented method of claim 12, wherein the entropy value is at least one of a local entropy value, or a global entropy value.

* * * * *